United States Patent [19]

Hale

[11] 3,938,963
[45] Feb. 17, 1976

[54] SANDWICH CORE PANEL HAVING CURED FACE SHEETS AND A CORE FORMED WITH PROJECTING MODES

[76] Inventor: Jesse R. Hale, 25913 Stanford St., Hemet, Calif. 92343

[22] Filed: Oct. 1, 1973

[21] Appl. No.: 402,188

[52] U.S. Cl. ................ 29/191.4; 52/618; 428/116; 428/178; 428/179
[51] Int. Cl.² ...................... B32B 3/12; B32B 3/28
[58] Field of Search ....... 161/68, 69, 110, 127, 139; 52/615, 618; 29/455 LM, 191, 191.4; 156/197; 428/116, 178, 179

[56] References Cited
UNITED STATES PATENTS

| | | | |
|---|---|---|---|
| 3,227,598 | 1/1966 | Robb | 161/68 |
| 3,231,454 | 1/1966 | Williams | 161/110 |
| 3,461,632 | 8/1969 | Kuhne | 161/68 X |
| 3,462,330 | 8/1969 | Greig et al. | 161/127 X |
| 3,525,663 | 8/1970 | Hale | 161/68 |
| 3,527,664 | 9/1970 | Hale | 161/68 |
| 3,561,177 | 2/1971 | Agro et al. | 161/68 X |
| 3,597,891 | 8/1971 | Martin | 52/618 X |
| 3,834,487 | 9/1974 | Hale | 161/68 X |

*Primary Examiner*—George F. Lesmes
*Assistant Examiner*—Henry F. Epstein
*Attorney, Agent, or Firm*—Edward A. Sokolski

[57] ABSTRACT

The core of a sandwich panel is formed with projecting nodes, the faces of the nodes being bonded to the face sheets of the panel. The node faces have the central portions thereof excised such that the remaining portion of these faces form flanges. These flanges are bent away from the center plane of the core and are shaped for optimum attachment to the curved panel face sheets without the need for crippling or deforming the node body and so that they enable the formation of a good bonded or brazed joint between the node faces and the face sheets.

7 Claims, 5 Drawing Figures

U.S. Patent  Feb. 17, 1976  3,938,963
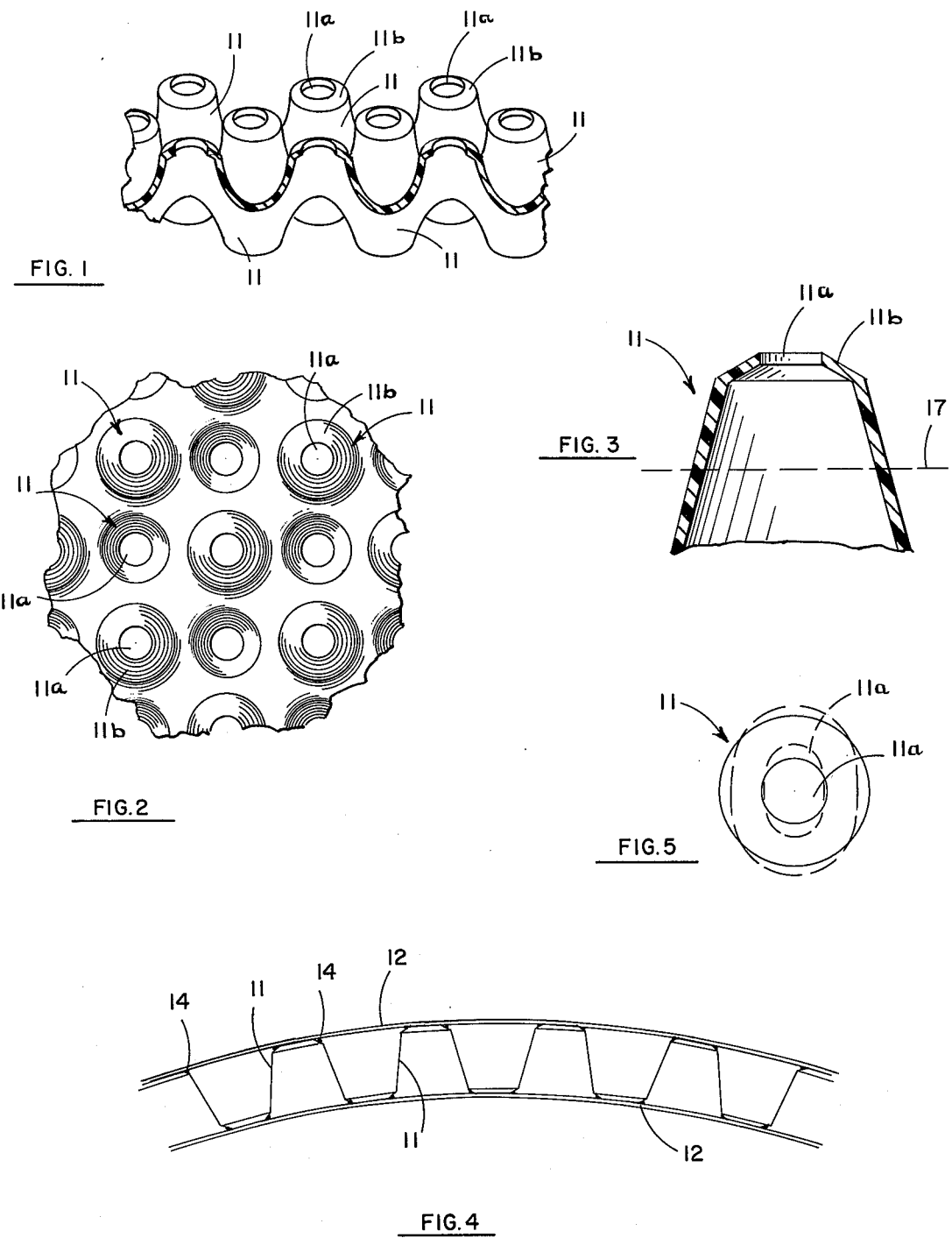

SANDWICH CORE PANEL HAVING CURED FACE SHEETS AND A CORE FORMED WITH PROJECTING MODES

This invention relates to sandwich core panels, and more particularly to such panels having a core formed from projecting nodes, the end faces of which are in the form of flanges.

In my U.S. Pat. Nos. 3,525,663 and 3,527,664, sandwich core panel structures are described which are formed from a core of projecting nodes with the end faces of these nodes being attached to the panel face sheets. Where forming such panel structures with single or double curved face sheets, it is necessary, particularly where brazing is utilized, that the core be bent to the contours of the ultimate sandwich panel shape, and that the node terminals are machined to conform to the face sheet contour. This operation is both costly and difficult. The present invention overcomes the aforementioned problem of the prior art in a simple and effective manner which obviates the need for machining the node end faces, at the same time assuring that the finished panel has an adequate bond integrity. This end result is achieved by excising out the central portions of the node end faces and forming flanges from the remaining end face portions which extend outwardly away from the center line of the core.

It is therefore an object of this invention to facilitate the bonding or brazing of node end faces to curved panel face sheets by a node terminal design which automatically conforms to the face sheets.

It is a further object of this invention to provide curved sandwich core panels utilizing nodal cores which have improved bond integrity.

Other objects of the invention will become apparent as the description proceeds in connection with the accompanying drawings, of which:

FIG. 1 is a perspective view of one embodiment of the invention;

FIG. 2 is a top plan view of the embodiment of FIG. 1;

FIG. 3 is an elevational view in cross section of one of the nodes of the illustrative embodiment;

FIG. 4 is an elevational view illustrating the illustrative embodiment as incorporated into a sandwich panel structure; and FIG. 5 is a top plan view illustrating deformation of the nodes with the application of pressure from the face sheets.

Briefly described, the device of the invention is as follows: The core for a sandwich panel structure is formed from oppositely projecting nodes. The central portions of the nodes are excised in a curved form which may be circular, the remaining portion of the nodes being bent outwardly away from the center plane of the core, to form flanges which may be conical or ellipsoidal in shape. Curved panel face sheets are adhered to the node face flanges by bonding or brazing to form the sandwich panel structure. The pressure of the curved panel sheets against the flanged node face in the bonding process shapes the flange to the optimized bonding geometry.

Referring now to the Figures, one embodiment of the invention is illustrated. The core structure of a sandwich panel is formed from a plurality of oppositely projecting nodes 11, as described in my U.S. Pat. No. 3,525,663. The central portions of the nodes 11a are excised in a generally circular shape. The excised portions 11a may in the fabrication of the core be made circular. However, with the application of pressure on the core from the face sheets, the circle may be deformed to the shape of an ellipse, as shown by the dotted line portions in FIG. 5. Part of the remaining unexcised portions 11b of the nodes are deformed outwardly, away from the center plane 17 of the core (see FIG. 3), to form flanges. These flanges may be in the form of a conical section or may have a curvature such as that of an ellipsoid. The angle at which flange portions 11b are bent away from the center line of the core should be such as to enable optimum joinder of the flanges to the panel face sheets. The flanges are joined to the face sheets as shown in FIG. 4 (at 14) by brazing, in the case of metallic cores and face sheets, and bonding in the case of plastic, paper, etc. Thus, the nodes of the core are adapted for optimum joinder to curved panel face sheets.

While the invention has been described and illustrated in detail, it is to be clearly understood that this is intended by way of illustration and example only and is not to be taken by way of limitation, the spirit and scope of this invention being limited only by the terms of the following claims.

I claim:

1. A sandwich panel comprising:
   first and second curved face sheets and
   a core formed from projecting nodes sandwiched between said face sheets, said core nodes having end face portions, the end face portions of the nodes being excised at the central part thereof, the remaining portions of said node end face portions forming flanges which are bent away from the center plane of the core and the longitudinal axes of their respective nodes, said flanges being joined to the panel face sheets and conforming to the contour thereof.

2. The sandwich panel of claim 1 wherein said flanges are in the form of a conical section.

3. The sandwich panel of claim 1 wherein said flanges are in the form of an ellipsoidal section.

4. The panel of claim 1 wherein the excised portions of the node end faces are elliptical in shape.

5. The sandwich panel structure of claim 1 wherein said flanges are brazed to the face sheets.

6. The sandwich panel structure of claim 1 wherein said flanges are bonded to the face sheets.

7. The sandwich panel structure of claim 1 wherein said core is formed from oppositely projecting nodes.

* * * * *